(12) United States Patent
Verma et al.

(10) Patent No.: US 11,265,462 B2
(45) Date of Patent: Mar. 1, 2022

(54) AUTOMATIC CAMERA SELECTION CAPTURING INTENDED SUBJECTS IN AN IMAGE

(71) Applicant: QUALCOMM Incorporated, San Diego, CA (US)

(72) Inventors: Nikhil Verma, Bangalore (IN); Vishnu Vardhan Kasilya Sudarsan, Bangalore (IN); Sumeet Kumar Sahu, Bangalore (IN); Ganesh Babu Ketti Gangadharan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/920,786

(22) Filed: Jul. 6, 2020

(65) Prior Publication Data

US 2022/0006948 A1    Jan. 6, 2022

(51) Int. Cl.
  *H04N 5/232* (2006.01)
  *H04N 5/247* (2006.01)
  *H04N 5/225* (2006.01)

(52) U.S. Cl.
  CPC ....... *H04N 5/23219* (2013.01); *H04N 5/2254* (2013.01); *H04N 5/23222* (2013.01); *H04N 5/23238* (2013.01); *H04N 5/247* (2013.01)

(58) Field of Classification Search
  CPC .......... H04N 5/23219; H04N 5/23238; H04N 5/2254; H04N 5/247; H04N 5/23222
  See application file for complete search history.

(56) References Cited

U.S. PATENT DOCUMENTS 7,676,146 B2   3/2010  Border et al.
7,729,602 B2   6/2010  Janson, Jr. et al.
(Continued)

FOREIGN PATENT DOCUMENTS

KR       101352206 B1     1/2014
KR     20170020069 A      2/2017
WO       2018159864 A1    7/2018

OTHER PUBLICATIONS

Partial International Search Report—PCT/US2021/029874—ISA/EPO—dated Jul. 14, 2021, 12 pages.
(Continued)

*Primary Examiner* — Jason A Flohre
(74) *Attorney, Agent, or Firm* — The Marbury Law Group, PLLC

(57) ABSTRACT

Methods for capturing intended subjects in an image are disclosed. Various embodiments may include determining a first quantity of a bilateral body part of individuals visible in a first preview image obtained by a first camera-lens combination having a first field of view, and automatically selecting one of a plurality of camera-lens combinations to use in capturing an image based on the first quantity of the bilateral body part of individuals visible in the first preview image. Some embodiments may include selecting a wide-angle camera-lens combination in response to the determined quantity of the bilateral body part of individuals visible in a first preview image is odd. Some embodiments may include automatically switching back to a standard or default camera-lens combination if an individual added in a wide-angle image is separated from the individuals visible in the first preview image by a predetermined threshold distance or distance ratio.

22 Claims, 8 Drawing Sheets

(56) References Cited

U.S. PATENT DOCUMENTS

| | | | |
|---|---|---|---|
| 2010/0173678 A1* | 7/2010 | Kim | H04N 5/23219 455/566 |
| 2013/0201359 A1 | 8/2013 | Wu et al. | |
| 2017/0013179 A1 | 1/2017 | Kang et al. | |
| 2017/0026582 A1* | 1/2017 | Kim | H04N 5/232945 |
| 2018/0070009 A1* | 3/2018 | Baek | H04N 5/23216 |
| 2020/0336660 A1* | 10/2020 | Dong | H04N 5/232935 |
| 2020/0344408 A1* | 10/2020 | Izuoka | H04N 5/232939 |

OTHER PUBLICATIONS

International Search Report and Written Opinion—PCT/US2021/029874—ISA/EPO—dated Sep. 6, 2021. 18 pages.

\* cited by examiner

AUTOMATIC CAMERA SELECTION CAPTURING INTENDED SUBJECTS IN AN IMAGE

BACKGROUND

Modern computing devices, like cellphones, laptops, and tablets are often used for photography and may include multiple cameras, each equipped with a different lens, such as a macro lens, a telephoto lens, a wide-angle lens, and a standard lens. A user selects one of the cameras for different photographic settings. For example, the camera with a wide-angle lens may be best for a group photo or for landscapes, while the camera with a macro lens may be best for close up photography. A user must manually select the camera with the desired lens, usually using the phone's display as a viewfinder to see what a selected lens will capture. This process is time consuming, which may cause the user to miss the opportunity to take a desired picture. Alternatively, one computing device uses multiple cameras simultaneously for one photo consumes undesirable additional battery power.

SUMMARY

Various aspects include methods and computing devices implementing the methods for capturing intended subjects in an image executed by a processor of a computing device that has a plurality of camera-lens combinations. Various aspects may include
determining a first quantity of a first bilateral body part of individuals visible in a first preview image obtained by a first camera-lens combination having a first field of view, and selecting one of the plurality of camera-lens combinations to use in capturing an image based on the determined first quantity of the first bilateral body part of individuals visible in the first preview image. The first bilateral body part may be one of ears, eyes, shoulders, or arms. Some embodiments may further include using only the first camera-lens combination to obtain view finder images while image signal processing blocks of other camera-lens combinations operate at low frames per second rates.

In some embodiments, selecting one of the plurality of camera-lens combinations to use in capturing the image based on the determined first quantity of the first bilateral body part of individuals visible in the first preview image may include determining whether the determined first quantity of the first bilateral body part visible in the first preview image is odd, and selecting a second camera-lens combination with a second field of view wider than that of the first field of view to use in capturing the image in response to determining that the determined first quantity of the first bilateral body part visible in the first preview image is odd. Some embodiments may further include selecting the first camera-lens combination to use in capturing the image in response to determining that the determined first quantity of the first bilateral body part visible in the first preview image is even.

Some embodiments may further include obtaining a second preview image using the second camera-lens combination, determining a second quantity of the first bilateral body part of individuals visible in the second preview image, determining whether the determined second quantity of the first bilateral body part visible in the second preview image is odd, and selecting the first camera-lens combination to use in capturing the image in response to determining that the second quantity of the first bilateral body part visible in the second preview image is odd.

Some embodiments may further include obtaining a second preview image using the second camera-lens combination, determining a second quantity of a second bilateral body part of individuals visible in the second preview image, wherein the second bilateral body part is different from the first bilateral body part, determining whether the determined second quantity of the second bilateral body part visible in the second preview image is odd, and selecting the first camera-lens combination to use in capturing the image in response to determining that the second quantity of the second bilateral body part visible in the second preview image is odd.

Some embodiments may further include determining from the first preview image an average separation distance between individuals visible in the first preview image, determining from a second preview image, obtained by the second camera-lens combination, an added individual separation distance between an individual visible in the second preview image but not fully visible in the first preview image and a closest one of the individuals visible in the first preview image, and selecting the first camera-lens combination to use in capturing the image in response to determining that the added individual separation distance exceeds the average separation distance between individuals visible in the first preview image by a predetermined threshold.

In some embodiments, each of the plurality of camera-lens combinations comprises one camera coupled to one lens, in which case selecting the first camera-lens combination includes selecting a first camera and selecting the second camera-lens combination includes selecting a second camera.

Further aspects include a computing device including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device for use in a computing device and configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
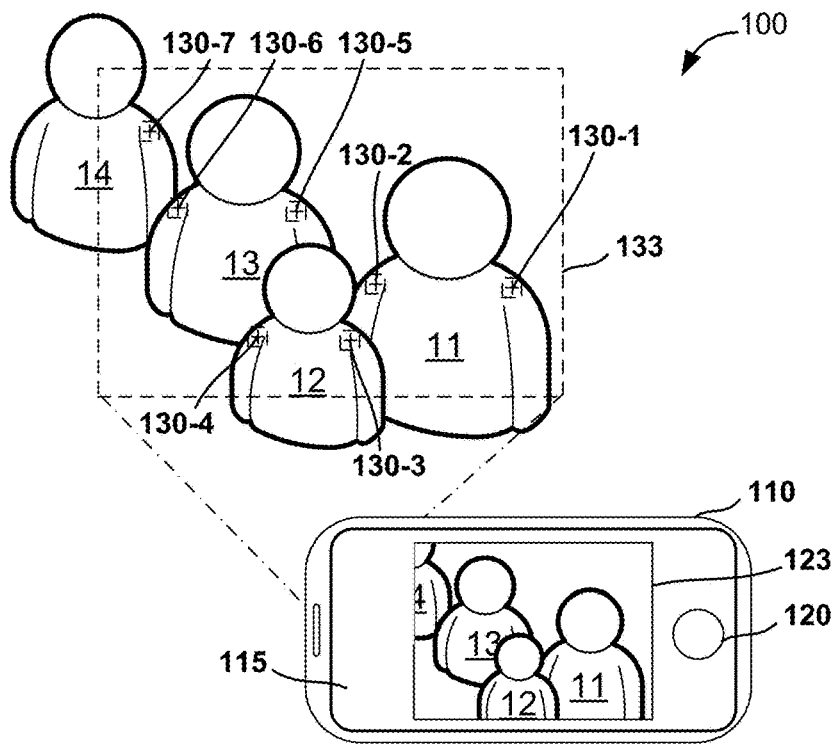
FIGS. 1A-1C are schematic diagrams illustrating a computing device capturing an image of individuals in accordance with various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments provide methods for automatically changing selected cameras or lenses to better capture intended subjects in an image. Some embodiments include determining a quantity of a bilateral body part of individuals visible in a first preview image obtained by a first camera using a first lens having a first field of view, determining whether the quantity is even or odd, and selecting a different camera-lens combination to use in capturing an image in response to the quantity of the bilateral body part of individuals visible in the first preview image being odd. Some embodiments may include obtaining the first preview image using a camera having a standard lens and selecting a camera having a wide angle to capture the image in response to the quantity being odd. To conserve battery power, only one camera-lens combination may be used to obtain preview images that are displayed to a user as view-finder images, as various embodiments enable evaluating other camera-lens combinations, particularly a wide-angle camera-lens combination without using such a camera to provide preview images, enabling their image signal processing blocks to run at low frames per second. Further embodiments include determining an average separation distance between individuals in the first preview image and a separation distance between individuals visible in the first preview image and an individual added in the field of view of the wide angle camera-lens, and if the separation distance between individuals visible in the first preview image and the individual added in the field of view of the wide angle camera-lens exceeds a threshold distance, switching back to the first camera/first lens if the threshold distance is exceeded.

As used herein, the term "image" refers to a visual representation, particularly of one or more individuals (i.e., people and/or creatures), made through a camera. Also, as used herein, the term "preview image" refers to a representation of an image presented on a display of a computing device. The computing device may provide the display of the preview image to help a user aim at and take a desired picture.

As used herein, the expression "bilateral body part" refers to any part of a person or creature, such as an extremity and/or section of a body, that is present on both sides of that person or creature. For example, bilateral body parts may include the eyes, eyebrows, cheeks, ears, shoulders, arms, elbows, forearms, hands, wrists, fingers, hips, legs, thighs, knees, shins/calves, ankles, feet, toes, and the like. In addition, bilateral body parts may include bilateral sections of a body, such as opposed sides of the head, torso, and/or combinations thereof with other body parts.

As used herein, the term "computing device" refers to an electronic device equipped with at least a processor, communication systems, and memory configured with a contact database. For example, computing devices may include any one or all of cellular telephones, smartphones, portable computing devices, personal or mobile multi-media players, laptop computers, tablet computers, 2-in-1 laptop/table computers, smartbooks, ultrabooks, palmtop computers, wireless electronic mail receivers, multimedia Internet-enabled cellular telephones, and similar electronic devices that include two or more cameras (or a camera with two or more lenses), a memory, and a programmable processor. In various embodiments, computing devices may be configured with memory and/or storage. Additionally, computing devices referred to in various example embodiments may be coupled to or include wired or wireless communication capabilities implementing various embodiments, such as network transceiver(s) and antenna(s) configured to communicate with wireless communication networks.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Various embodiments may automatically determine whether a camera and lens obtaining a preview image desirable lens should be used or changed to capture intended subjects of an image. A computing device, particularly a mobile computing device, may be configured to identify body parts within a preview image taken through a first camera lens. Using an image processing software, the computing device may identify features on a face, head, or other body parts that may be out of the frame or "cut off." In particular, the computing device may analyze the preview image to determine how many of a particular bilateral body part are visible in the preview image. An odd number of the bilateral body parts (e.g., eyes, ears, etc.) may indicate that a face is partly out of the frame. Thus, in response to determining that an odd number of the bilateral body parts are visible in the preview image, a processor of the computing device may select a wide-angle lens or a camera having a wide-angle lens to capture the image.

Some embodiments further include analyzing the separation distances between individuals in the first preview image and a second preview image made using a wide-angle lens (e.g., a camera having a wide-angle lens) to determine whether an individual appearing in the second preview image but not the first preview image (i.e., added by switching to the wide-angle lens) is separated from the other individuals by a separation distance that exceeds the average separation distance among the individuals in the first preview image by a threshold amount (or percentage). For example, if an individual appears in the second preview image significantly removed from the individuals appearing in the first preview image, it is likely that the person taking photograph did not intend to include that added individual. Therefore, to avoid inserting individuals into a photograph that were not intended by the user, the computing device may automatically switch back to the lens or camera/lens used to generate the first preview image (e.g., a normal lens) for taking the group photo in response to determining the added individual is separated from the others by more than the threshold difference. Individuals gather together for photographs differently depending upon their relationships, the context of the photograph, etc., so the threshold difference used to determine whether to switch back to the first camera/lens may be a relative factor. For example, the processor of the computing device may determine whether a ratio of the separation distances between individuals in the first preview image and the separation distance of the added individual(s) exceeds a threshold ratio value.

Various embodiments may be implemented in computing devices that include a camera that can use multiple lenses with different fields of view or that include multiple cameras each configured with a lens with different fields of view. For ease of reference, the terms "camera-lens combination" and "multiple camera-lens combinations" are used herein to refer generally to both embodiments employing a single camera (or few cameras) that are configured to be selectively coupled to multiple different types of lenses (e.g., standard, wide-angle, telephoto, etc.), including compound lenses that can be configured as standard and wide-angle, and to embodiments employing multiple cameras each coupled to a different type of lens (e.g., standard, wide-angle, telephoto, etc.). Further, references to selecting or changing lenses and references to selecting or changing cameras in the descriptions of various embodiments are not intended to limit the claims to one implementation or the other.

Various embodiments improve the user experience of using a computing device to capture images of groups of individuals by automatically evaluating whether a different camera-lens combination will result in a better group photograph. In addition to providing enabling users to capture better images in some circumstances, various embodiments may conserve battery power by using only one camera-lens combination to obtain preview images that are displayed to the user as view-finder images, enabling low frames-per-second operation of other camera-lens combinations, particularly a wide-angle camera-lens combination.

Figure 1B:
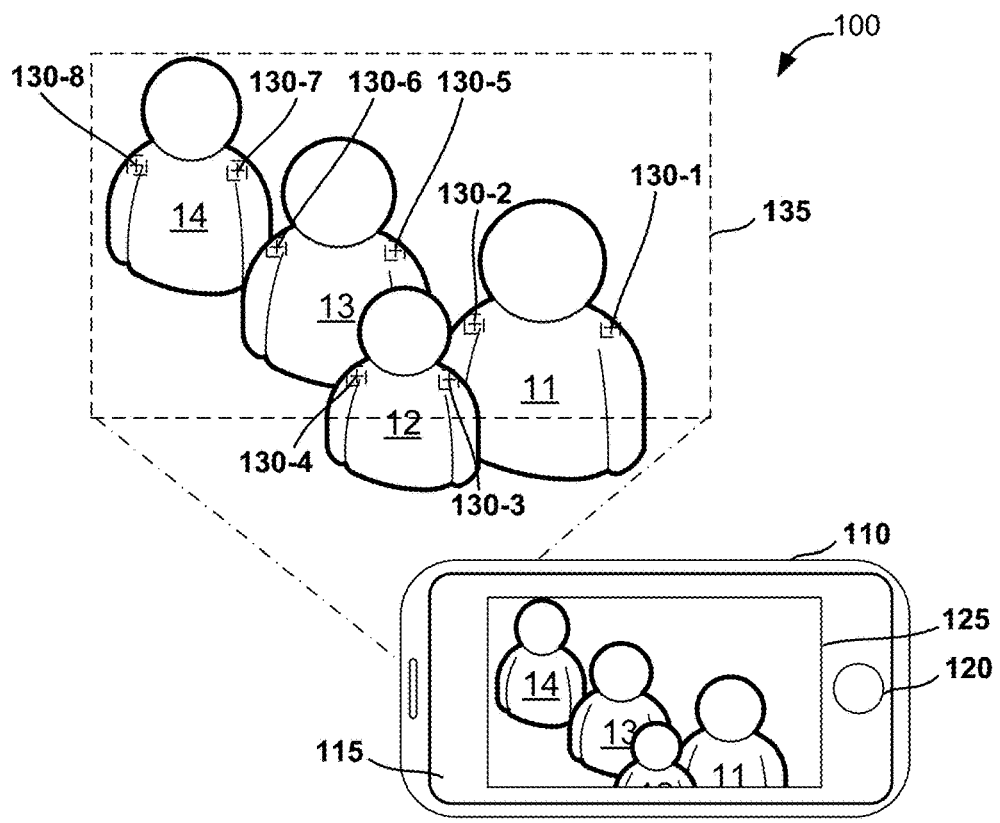
Figure 1C:
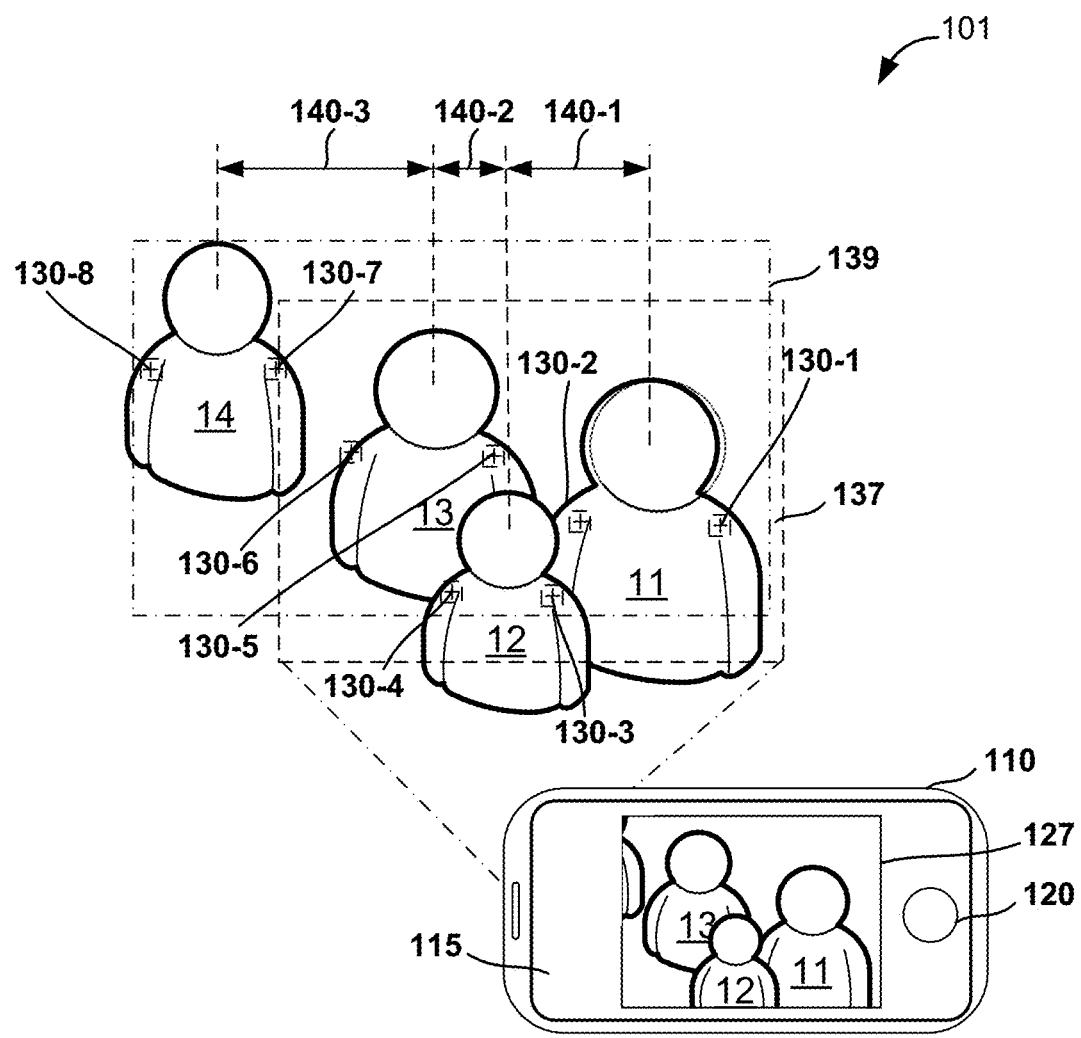

FIGS. 1A-1C illustrate an example computing device 110 that is suitable for implementing various embodiments. FIGS. 1A-1C illustrate scenes 100, 101 in which a group of individuals 11, 12, 13, 14 are being photographed by the computing device 110. The computing device 110, which is controlled by one or more processors, includes a display 115 and either one camera couple to multiple interchangeable lenses or multiple cameras configured with lenses of different fields of view (i.e., multiple camera-lens combinations). The display 115 is configured to present preview images captured using the at least one camera. In addition, as is the case with many mobile computing devices, the display 115 may also be configured to present text, graphics, other images, and video, at least temporarily, for viewing. The display 115 may be a visual display screen as well as a touch-sensitive input screen, although the computing device 110 may also include buttons for receiving inputs. In accordance with various embodiments, the display 115 may be configured to present information from an application or program, such as preview images and other information from a camera application. For example, the camera application may display a push-button 120, which acts like a shutter button found on conventional cameras, and display preview images 123, 125, 127.

The multiple camera-lens combinations of the computing device 110 (e.g., a smartphone) will generate different fields of view 133, 135, 137, 139 that reflect the extent of the observable world that is captured in images taken by camera-lens combination. In each of FIGS. 1A-1C, the field of view 133, 135, 137, 139 (represented by a dotted rectangle defining a viewable portion of the group of individuals 11, 12, 13, 14) is reflected in a preview image 123, 125, 127 presented on the display and represents the scene that will be captured in pictures taken by the camera-lens combination. Different types of lenses have different fields of view. For example, a standard lens has a field of view that captures less of the real world than a wide-angle lens. Similarly, a telephoto lens has a narrow field of view that captures less of the real world than the standard lens.

In various embodiments, the computing device 110 may include a processor configured with image processing software configured to analyze digital images and detect features therein. In particular, the image processing software may be configured to recognize and identify particular body parts of individuals (i.e., people or creatures) captured in an image, such as a bilateral body part (e.g., eyes, ears, shoulders, etc.). While identifying the bilateral body part in an image, the processor may determine the number (i.e., count) of the bilateral body parts that appear in the image. In FIGS. 1A-1C the bilateral body part identified by the processor is the shoulder or shoulder region (labeled as 130-1 to 130-8 in FIG. 1B). However, different bilateral body parts (e.g., eyes, ears, etc.) may be identified and counted by the computing device processor in various embodiments. Also, in some embodiment more than one bilateral body part may be identified and counted for capturing intended subjects in an image.

Like facial recognition software, image processing in various embodiments may use neural networks, knowledge-based, appearance-based, template matching, and/or other techniques for detecting bilateral body parts of individuals visible in an image. Knowledge-based systems may use a set of rules based on human knowledge about imaging in order to identify body parts. Feature-based systems may extract structural features from an image and use classification/differentiation to identify body parts. Template matching uses pre-defined or parameterized body part templates to locate or detect the bilateral body parts by the correlation between the templates and input images. Appearance-based systems use a set of delegate training body-part images to find out body-part models. Similarly, other systems and techniques may be used or included as part of the image processing software in order to detect and identify particular body parts visible in an image.

FIG. 1A shows a preview image 100 in which includes the computing device 110 using a standard camera-lens combination (i.e., the camera-lens combination that is used as a default combination for preview image capture and photography) to generate a first preview image 123 on the display 115 having a first field of view 133. The first preview image 123 shows that the first field of view 133 has captured most of the four individuals 11, 12, 13, 14. In particular, while most of the first three individuals 11, 12, 13 are in the first field of view 133, less than half of the fourth individual 14 is in the frame.

FIG. 1A illustrates how a processor using image processing techniques may detect or recognize numerous shoulders 130-1, 130-2, 130-3, 130-4, 130-5, 130-6, 130-7 from the individuals 11, 12, 13, 14 in the first field of view 133. In addition, the processor may determine that there are seven (7) shoulders 130-1, 130-2, 130-3, 130-4, 130-5, 130-6, 130-7 detected in the first field of view 133. Since the number of detected shoulders is an odd number, this suggests that one of the individuals on the outer edges of the field of view 133 may have been cut-off and are not properly included in the image. Thus, in response to determining that an odd number of shoulders are detected or recognized in the first field of view 133, the processor may select a different camera-lens combination to use in capturing an image, such as a wide-angle camera-lens combination.

FIG. 1B shows the computing device 110 using a wide-angle camera-lens combination to generate a second preview image 125 on the display 115 having a second field of view 135. As an example, the wide-angle camera-lens combination may provide an angle of view between 64 degrees and 84 degrees, which may translate to a 35-24 mm film format. The second preview image 125 shows that the second field of view 135 has captured almost all of the four individuals 11, 12, 13, 14, including an even number of shoulders 130-1 to 130-8. Since the quantity of eight (8) shoulders 130-1, 130-2, 130-3, 130-4, 130-5, 130-6, 130-7, 130-8 recognized in the second preview image 125 is an even number, this may suggest to the processor that all individuals intended by the photographer to be in the photo are now being captured in the second field of view 135, that is by the wide-angle camera-lens combination.

FIG. 1C shows a scene 101 that is similar to the scene shown 100 shown in FIGS. 1A and 1B, except that the fourth individual 14 is spaced apart from the group of three individuals 11, 12, 13 by an amount that is significantly larger than the average separation distance of the individuals within the group. FIG. 1C also shows a comparison of a third field of view 137 of the standard camera-lens combination providing a third preview image 127 versus the field of view 139 of the wide-angle camera-lens combination. In some embodiments (not shown), a preview image encompassing the four field of view 137 (i.e., the field of view of the wide-angle camera-lens combination) may be presented on the display 115 in response to a processor of the computing device 110 switching to the wide-angle camera-lens combination in response to counting an odd number of shoulders in the first preview image.

FIG. 1C illustrates how a processor may use image processing to determine separation distances 140-1, 140-2, 140-3 between adjacent individuals 11-12, 12-13, 13-14 and/or groups of individuals. Using the determined separation distances, the processor may determine from the third preview image 127 (which corresponds to the field of view 137 of the standard camera-lens combination) an average separation distance between the individuals recognized in that image (i.e., individuals 11, 12, 13). In the scene 101, the average separation distance would be an average of the first separation distance 140-1 and the second separation distance 140-2. In an image encompassing the fourth field of view 139, the processor may determine the separation distance 140-3 between the individual added in the wide-angle view (i.e., visible in the fourth field of view 139 but not the third field of view 137) and the group of individuals 11, 12, 13 in the third preview image 127. If the new individual separation distance 140-3 is greater than the average separation distance (i.e., the average of the first separation distance 140-1 and the second separation distance 140-2) by more than a predetermined threshold distance or percentage the processor may automatically select the first camera-lens combination to use in capturing the image.

The separation distance 140-3 of the individual encompassed in the wide-angle field of view 139 but not the standard field of view 137 from the group may be measured from the closest individual (i.e., 13) within group of individuals 11, 12, 13. While FIG. 1C shows the point of reference for separation distance measurements is a center point of individuals different points of measurement may be used for the spacing or separation distance comparisons (e.g., one side of the head of each individual).

Some embodiments may perform the process of recognizing and counting bilateral body parts for a number of different bilateral body parts and comparing the results so as to improve the automatic camera-lens combination selection. For example, the computing device processor may compare the number of eyes and the number of ears in preview images and use the number of both parts to select the camera-lens combination to use to capture an image. Similarly, in some embodiments, the processor may determine separation distances among individuals in images based on more than one feature (e.g., head-to-head separation and shoulder-to-shoulder separation).

Figure 2:
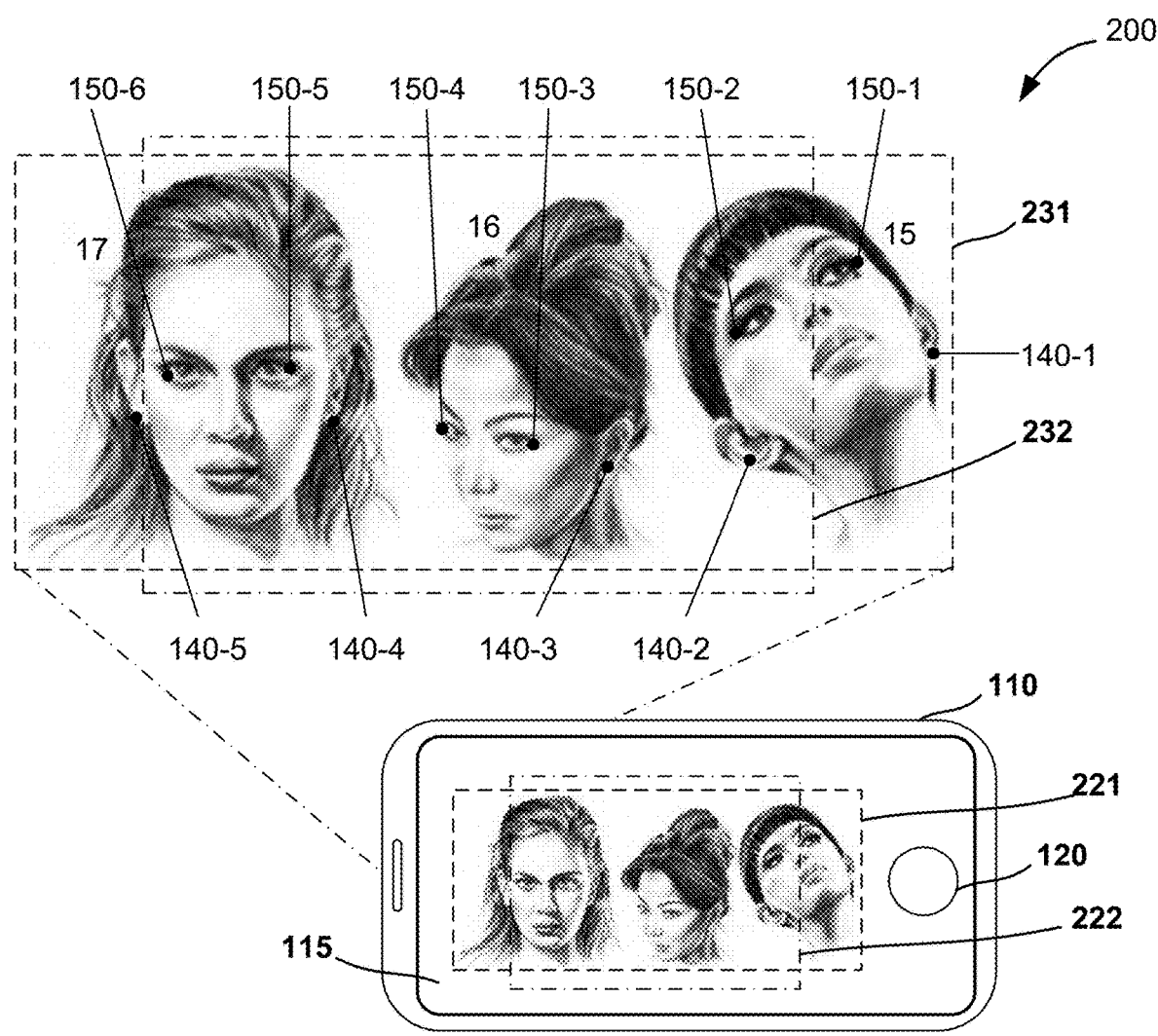
FIG. 2 is a schematic diagram illustrating a computing device capturing images of individuals in accordance with various embodiments.

To illustrate the advantages of recognizing and counting different kinds of bilateral body parts, FIG. 2 illustrates a scene 200 that includes a close-up of three individuals 15, 16, 17 posing for a picture before the computing device 110. In FIG. 2, the camera of the computing device 110 is shown simultaneously displaying a first preview image 221 captured by a wide-angle lens camera-lens combination superimposed with a second preview image 222 captured by another camera-lens combination (e.g., a standard camera-lens combination). FIG. 2 illustrates that a processor using image processing will recognize that five (5) ears 140-1, 140-2, 140-3, 140-4, 140-5 are visible in the first preview image 221 obtained using a first camera-lens combination (i.e., the wide-angle camera-lens combination) having a first field of view 231. Since five (5) is an odd number, the processor may automatically perform a bilateral body part count using a different camera-lens combination. For example, the processor may determine that three (3) ears 140-2, 140-3, 140-4 are visible in the second preview image 222 obtained using a second camera-lens combination having a second field of view 232. However, since this second bilateral body part count is still an odd number, this may suggest to the processor that changing the camera-lens combination is no more likely to provide a desired image. In some embodiments, the processor may render both the first and second preview images 221, 222 overlaid on one another of the display to allow the user to simultaneously see both preview images 221, 222 and select the desired camera-lens combination.

Alternatively, the processor may reassess the first and second preview images 221, 222 using a different bilateral body part, such as the eyes. In this case, the processor would recognize six (6) eyes 150-1, 150-2, 150-3, 150-4, 150-5, 150-6 visible in the first preview image 221 obtained using the first (i.e., wide-angle) camera-lens combination having the first field of view 231, but recognize only five (5) eyes 150-1, 150-2, 150-3, 150-4, 150-5 visible in the second preview image 222 obtained using the second camera-lens combination having the second field of view 232. In response to the count of eyes, the processor may determine that the first preview image 221 that encompasses even number of eyes (i.e., six), is more likely to provide a desired image. Accordingly, the processor may automatically select (or recommend) the first camera-lens combination to use for capturing the image.

Figure 3:
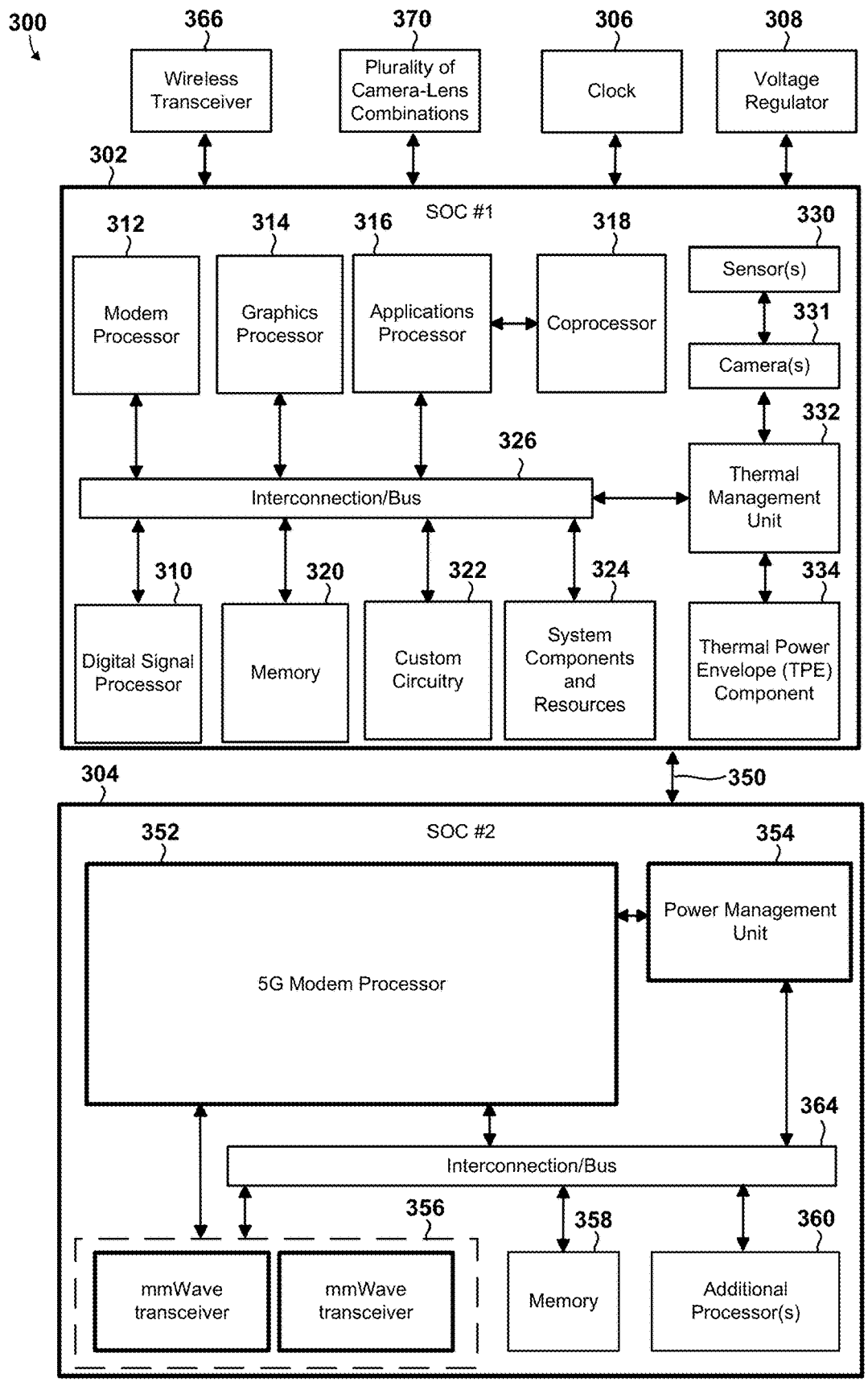
FIG. 3 is a block diagram illustrating components of an example system in a package for use in a computing device in accordance with various embodiments.

Various embodiments may be implemented using a number of single processor and multiprocessor computer systems, including a system-on-chip (SOC) or system in a package (SIP). FIG. 3 illustrates an example computing system or SIP 300 architecture that may be used in wireless devices implementing the various embodiments.

With reference to FIGS. 1A-3, the illustrated example SIP 300 includes a two SOCs 302, 304, that may be coupled to a clock 306, a voltage regulator 308, and one or more wireless transceivers 366 and a plurality of camera-lens combinations 370a, 370b. In some embodiments, the first SOC 302 operates as central processing unit (CPU) of the wireless device that carries out the instructions of software application programs by performing the arithmetic, logical, control and input/output (I/O) operations specified by the instructions. In some embodiments, the second SOC 304 may operate as a specialized processing unit. For example, the second SOC 304 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 302 may include a digital signal processor (DSP) 310, a modem processor 312, a graphics processor 314, an application processor 316, one or more coprocessors 318 (e.g., vector co-processor) connected to one or more of the processors, memory 320, custom circuitry 322, system components and resources 324, an interconnection/bus module 326, one or more sensors 330 (e.g., temperature, motion, proximity, etc.), camera(s) 331, a thermal management unit 332, and a thermal power envelope (TPE) component 334. The second SOC 304 may include a 5G modem processor 352, a power management unit 354, an interconnection/bus module 364, a plurality of mmWave transceivers 356, memory 358, and various additional processors 360, such as an applications processor, packet processor, etc.

Each processor 310, 312, 314, 316, 318, 352, 360 may include one or more cores, and each processor/core may perform operations independent of the other processors/cores. For example, the first SOC 302 may include a processor that executes a first type of operating system (e.g., FreeBSD, LINUX, OS X, etc.) and a processor that executes a second type of operating system (e.g., MICROSOFT WINDOWS 10). In addition, any or all of the processors 310, 312, 314, 316, 318, 352, 360 may be included as part of a processor cluster architecture (e.g., a synchronous processor cluster architecture, an asynchronous or heterogeneous processor cluster architecture, etc.).

The first and second SOC 302, 304 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 324 of the first SOC 302 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 324 and/or custom circuitry 322 may also include circuitry to interface with peripheral devices, such as cameras, electronic displays, wireless communication devices, external memory chips, etc.

The first and second SOC 302, 304 may communicate via interconnection/bus module 350. The various processors 310, 312, 314, 316, 318, may be interconnected to one or more memory elements 320, system components and resources 324, and custom circuitry 322, and a thermal management unit 332 via an interconnection/bus module 326. Similarly, the processor 352 may be interconnected to the power management unit 354, the mmWave transceivers 356, memory 358, and various additional processors 360 via the interconnection/bus module 364. The interconnection/bus module 326, 350, 364 may include an array of reconfigurable logic gates and/or implement a bus architecture (e.g., Core Connect, AMBA, etc.). Communications may be provided by advanced interconnects, such as high-performance networks-on chip (NoCs).

The first and/or second SOCs 302, 304 may further include an input/output module (not illustrated) for communicating with resources external to the SOC, such as a clock 306 and a voltage regulator 308. Resources external to the SOC (e.g., clock 306, voltage regulator 308) may be shared by two or more of the internal SOC processors/cores.

In addition to the example SIP 300 discussed above, various embodiments may be implemented in a wide variety of computing systems, which may include a single processor, multiple processors, multicore processors, or any combination thereof.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Figure 4:
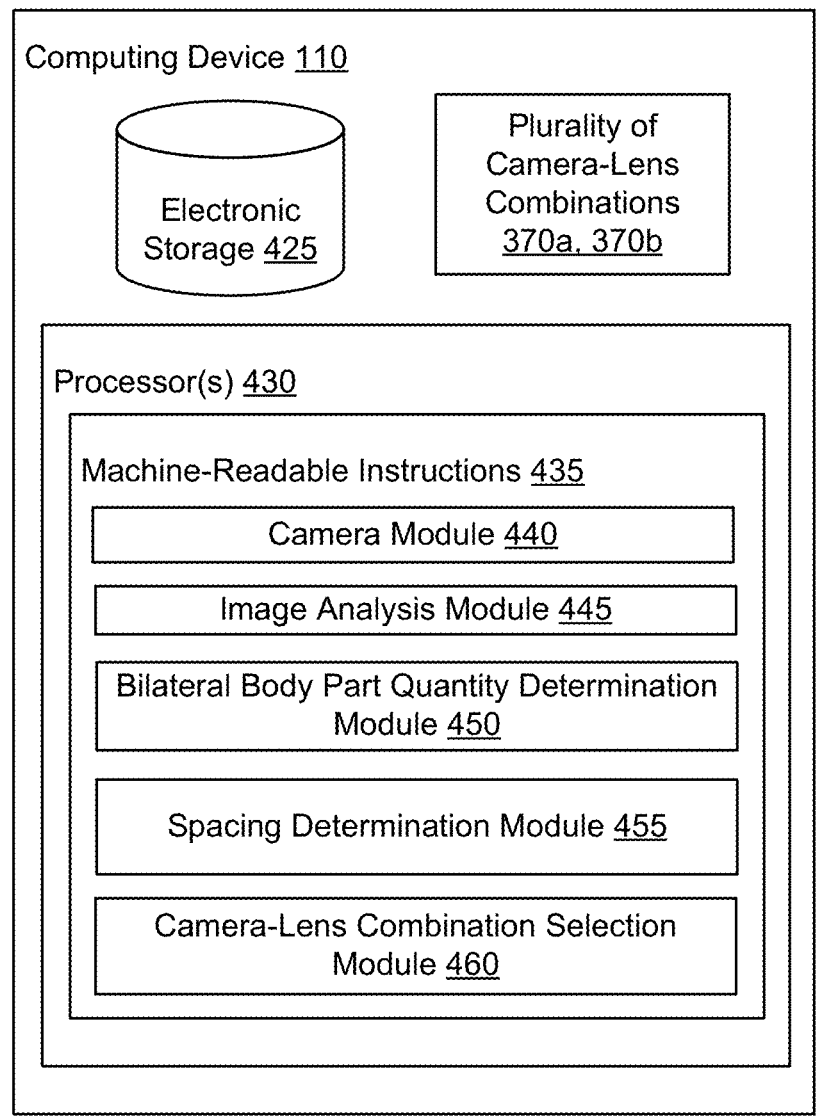
FIG. 4 shows a component block diagram of an example system configured for capturing intended subjects in an image.

FIG. 4 is a component block diagram illustrating a computing device 110 configured for capturing intended subjects in an image, executed by a processor of a computing device in accordance with various embodiments. With reference to FIGS. 1A-4, a computing device 110 may include a plurality of camera-lens combinations 370a, 370b, electronic storage 425, one or more processors 430, and/or other components. The illustration of the computing device 110 in FIG. 4 is not intended to be limiting. The computing device 110 may include a plurality of hardware, software, and/or firmware components operating together to provide the functionality attributed herein to the computing device 110.

Electronic storage 425 may comprise non-transitory storage media that electronically stores information. The electronic storage media of electronic storage 425 may include one or both of system storage that is provided integrally (i.e., substantially non-removable) with the computing device 110 and/or removable storage that is removably connectable to the computing device 110 via, for example, a port (e.g., a universal serial bus (USB) port, a FireWire port, etc.) or a drive (e.g., a disk drive, etc.). The electronic storage 425 may store software algorithms, information determined by processor(s) 430, information received from the computing device 110, image data received from the plurality of camera-lens combinations 370*a*, 370*b*, and/or other information that enables the computing device 110 to function as described herein.

Processor(s) 430 may be configured to provide information processing capabilities in the computing device 110. As such, processor(s) 430 may include one or more of a digital processor, an analog processor, a digital circuit designed to process information, an analog circuit designed to process information, a state machine, and/or other mechanisms for electronically processing information. Although processor (s) 430 is shown in FIG. 4 as a single entity, this is for illustrative purposes only. In some implementations, processor(s) 430 may include a plurality of processing units. These processing units may be physically located within the same device, or processor(s) 430 may represent processing functionality of a plurality of devices operating in coordination.

The computing device 110 may be configured by machine-readable instructions 435, which may include one or more instruction modules. The instruction modules may include computer program modules. In particular, the instruction modules may include one or more of a camera module 440, an image analysis module 445, a bilateral body part quantity determination module 450, a separation distance determination module 455, a camera lens-selection module 460, and/or other instruction modules.

The camera module 440 may be configured to control the plurality of camera-lens combinations 370*a*, 370*b* and related components (e.g., flash, sensors, etc.) for taking pictures with the computing device 110. By way of non-limiting example, a processor (e.g., 310, 312, 314, 316, 318, 352, 360) of a computing device (e.g., 110) may use the plurality of camera-lens combinations 370*a*, 370*b* and/or one or more sensors (e.g., 330) to determine one or more elements that contribute to obtaining images using the camera. The camera module 440 may obtain preview images and captured images (i.e., saved pictures) taken with the camera(s) using the plurality of camera-lens combinations 370*a*, 370*b*. For example, the processor may control showing preview images on a display (e.g., 115) of the computing device (e.g., 110), which may access electronic storage (e.g., 425) thereof, and along with the captured images be saved in memory (e.g., 320). Also, the camera module 440 may be configured to combine images from the plurality of camera-lens combinations 370*a*, 370*b*. By way of non-limiting example, the camera-lens combinations may include a standard angle lens, a wide-angle lens, a telephoto lens, an adjustable zoom lens, a close-up lens, other lenses, and any combination thereof.

The image analysis module 445 may be configured to analyze images, such as preview images for identifying features therein. By way of non-limiting example, the image analysis module 445 may include and/or use the processor (e.g., 310, 312, 314, 316, 318, 352, 360) of the computing device (e.g., 110), which may access electronic storage (e.g., 425) thereof, for image processing to detect select body parts, and particularly bilateral body parts (e.g., eyes, ears, shoulders, etc.).

The bilateral body part quantity determination module 450 may be configured to determine a quantity of a particular bilateral body part from individuals visible in a preview image obtained by a camera-lens combination having a first field of view. By way of non-limiting example, a processor (e.g., 310, 312, 314, 316, 318, 352, 360) of a computing device (e.g., 110) may access electronic storage (e.g., 425) to determine the quantity of the bilateral body part visible in the preview image. The bilateral body part quantity determination module 450 may be configured to determine whether the determined quantity of the bilateral body part is odd (i.e., not even) or even. By way of non-limiting example, the bilateral body part from individuals visible in the first preview image may be any one or more of ears, eyes, shoulders, arms, eyebrows, cheeks, elbows, forearms, hands, wrists, fingers, hips, legs, thighs, knees, shins/calves, ankles, feet, toes, and the like. In addition, the bilateral body parts may include bilateral sections of a body, such as opposed sides of the head, torso, and/or combinations thereof with other body parts.

The separation distance determination module 455 may be configured to determine from a preview image, such as a first and/or second preview image, an average separation distance between individuals visible therein. The separation distance determination module 455 may also be configured to determine an individual separation distance between an individual visible in the second preview image but not visible in the first preview image and a group comprising the individuals visible in the first preview image.

The camera lens-selection module 460 may be configured to select one of the plurality of camera-lens combinations 370*a*, 370*b* to use in capturing an image based on a determined quantity of a bilateral body part of individuals visible in a preview image. The camera lens-selection module 460 may select a first camera-lens combination to use in capturing the image in response to determining that the determined first quantity of the bilateral body part visible in the first preview image is even, and select a second camera-lens combination to use in capturing the image in response to determining that the determined first quantity of the bilateral body part visible in the first preview image is odd. The camera lens-selection module 460 may also be configured to select a first camera-lens combination to use in capturing an image in response to determining that the separation distance of an individual appearing in the second preview image exceeds an average separation distance of individuals appearing in the first preview image by a predetermined threshold distance or distance ratio.

The processor(s) 430 may be configured to execute modules 440, 445, 450, 455, and/or 460, and/or other modules. Processor(s) 430 may be configured to execute modules 440, 445, 450, 455, and/or 460, and/or other modules by software; hardware; firmware; some combination of software, hardware, and/or firmware; and/or other mechanisms for configuring processing capabilities on processor(s) 430. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 440, 445, 450, 455, and/or 460 described below is for illustrative purposes, and is not intended to be limiting, as any of modules 440, 445, 450, 455, and/or 460 may provide more or less functionality than is described. For example, one or more of modules 440, 445, 450, 455, and/or 460 may be eliminated, and some or all of its functionality may be provided by other ones of modules 440, 445, 450, 455, and/or 460. As another example, processor(s) 430 may be configured to execute one or more additional modules that may perform some or all of the functionality attributed below to one of modules 440, 445, 450, 455, and/or 460.

Figure 5A:
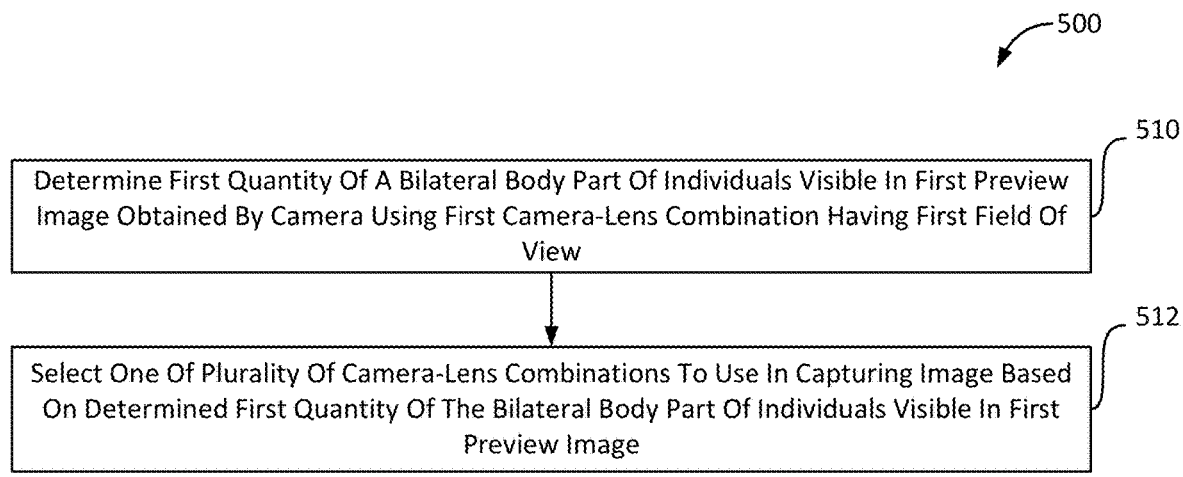
FIGS. 5A, 5B, 5C, and/or 5D show process flow diagrams of example methods for capturing intended subjects in an image according to various embodiments.
Figure 5B:
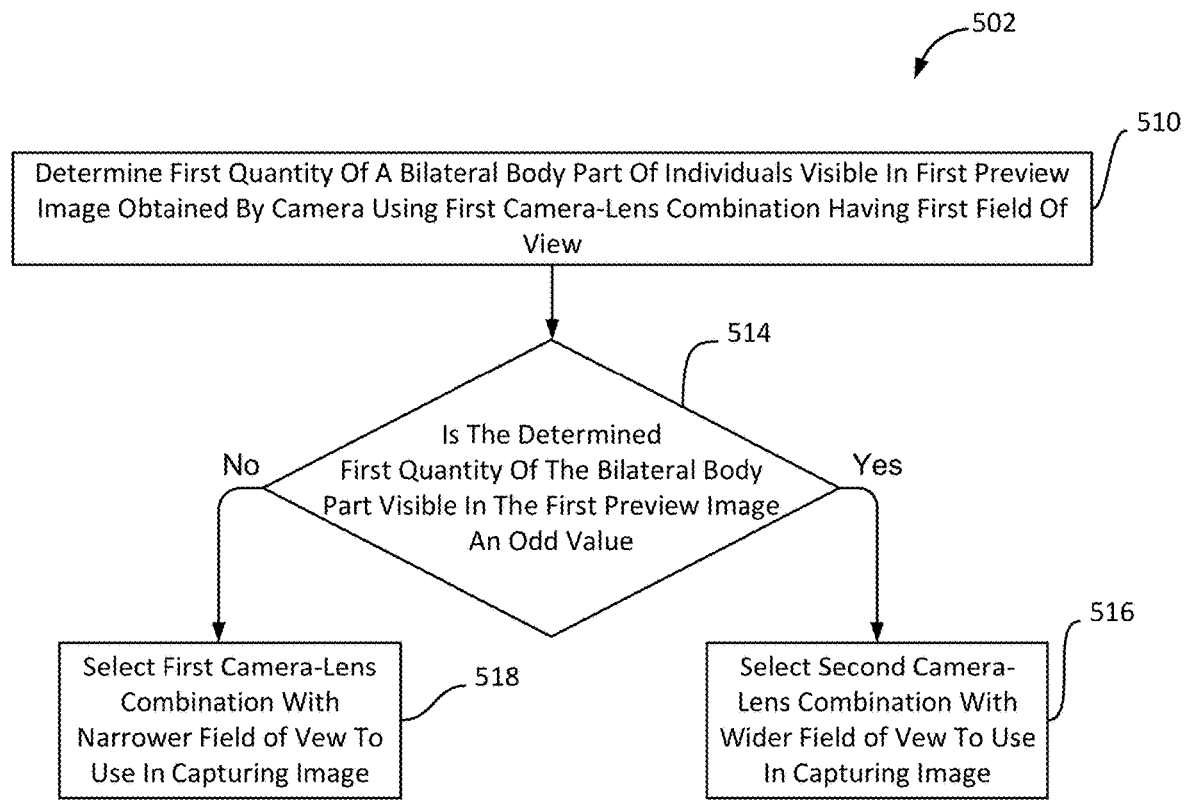
Figure 5C:
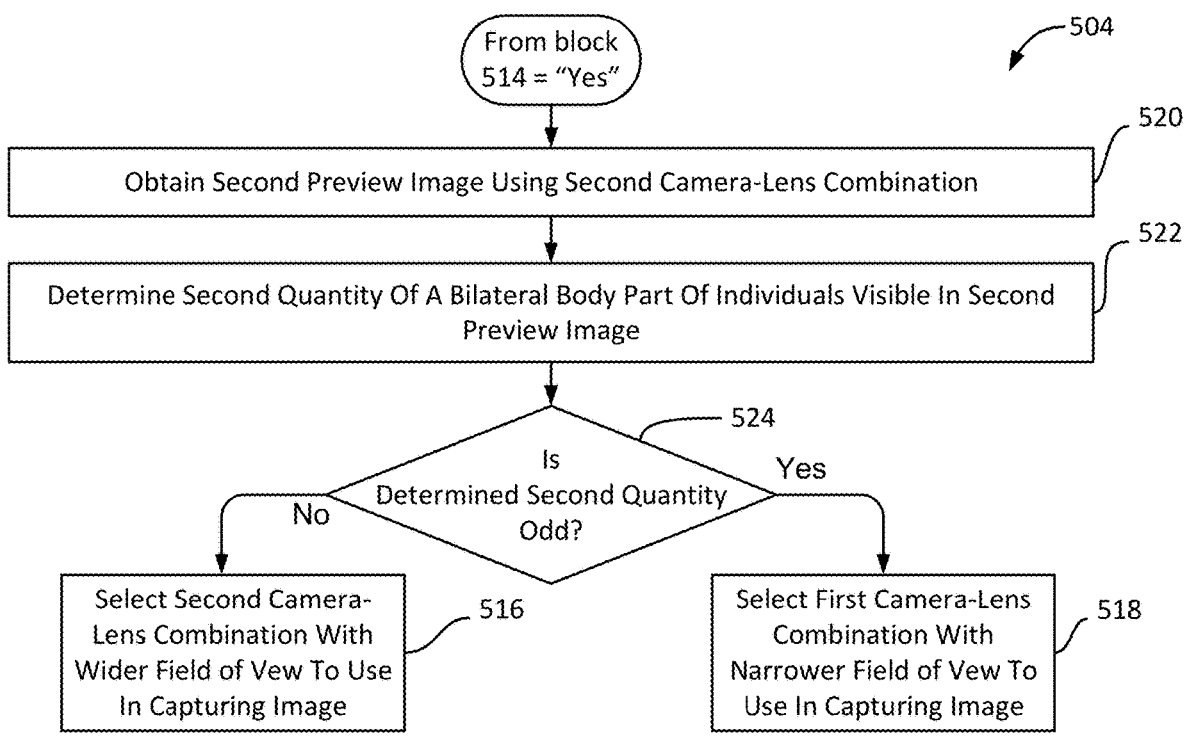

FIGS. 5A, 5B, 5C, and/or 5D illustrate(s) operations of methods 500, 502, 504, 506 for capturing intended subjects in an image in accordance with various embodiments. With reference to FIGS. 1-5A, 5B, 5C, and/or 5D, the operations of the methods 500, 502, 504, 506 are intended to be illustrative. In some embodiments, methods 500, 502, 504, 506 may be accomplished with one or more additional operations not described, and/or without one or more of the operations discussed. Additionally, the order in which the operations of the methods 500 are illustrated in FIGS. 5A, 5B, 5C, and/or 5D and described below is not intended to be limiting.

The methods 5A, 5B, 5C, and/or 5D may be implemented in one or more processors (e.g., a digital processor, an analog processor, a digital circuit designed to process information, an analog circuit designed to process information, a state machine, and/or other mechanisms for electronically processing information) in response to instructions stored electronically on an electronic storage medium of a computing device. The one or more processors may include one or more devices configured through hardware, firmware, and/or software to be specifically designed for execution of one or more of the operations of the methods 500, 502, 504, 506. For example, with reference to FIGS. 1-5A, 5B, 5C, and/or 5D, the operations of the methods 500, 502, 504, 506 may be performed by a processor (e.g., 302, 304, 310, 312, 314, 316, 318, 352, 360) of a computing device (e.g., 110)), which may access electronic storage (e.g., 320, 358, 425) thereof.

FIG. 5A illustrates a method 500 for capturing intended subjects in an image, in accordance with various embodiments. In block 510, the processor of the computing device may perform operations including determining a first quantity of a bilateral body part of individuals visible in a first preview image obtained by a first camera-lens combination having a first field of view. For example, the processor may use image analysis techniques to analyze a preview image (e.g., 123) associated with a field of view (e.g., 133) to identify and count shoulders, eyes, ears or other body part of individuals visible in the preview image. To conserve battery power, only the first camera-lens combination may be used to obtain preview images that are displayed to a user as view-finder images while image signal processing blocks of other camera-lens combinations operate at low frames per second. The means for performing the operations of block 510 may include a processor (e.g., 302, 304, 310, 312, 314, 316, 318, 352, 360) coupled to a plurality of camera-lens combinations (e.g., 370a, 370b) and electronic storage (e.g., 320, 358, 425).

In block 512, the processor of the computing device may perform operations including selecting one of the plurality of camera-lens combinations to use in capturing an image based on the determined first quantity of the bilateral body part of individuals visible in the first preview image. The means for performing the operations of block 502 may include a processor (e.g., 302, 304, 310, 312, 314, 316, 318, 352, 360) coupled to a plurality of camera-lens combinations (e.g., 370a, 370b) and electronic storage (e.g., 320, 358, 425).

FIG. 5B illustrates a method 502 according to some embodiments for capturing intended subjects in an image.

In block 510, the processor may determine a first quantity of a first bilateral body part of individuals visible in a first preview image obtained by a first camera-lens combination having a first field of view as described.

In determination block 514, the processor of a computing device may perform operations including determining whether the determined first quantity of the first bilateral body part visible in the first preview image is an odd number. In this manner, the suitability of the first camera-lens combination an a second (e.g., wide-angle) camera-lens combination may be evaluated by the processor without using the second camera-lens combination to obtain viewfinder images, enabling image signal processing blocks of the second camera-lens combination (as well as other camera-lens combinations) to remain running at a power-conserving low frames-per-second rate. The means for performing the operations of block 514 may include a processor (e.g., 302, 304, 310, 312, 314, 316, 318, 352, 360) and electronic storage (e.g., 320, 358, 425).

In response to determining that the determined first quantity of the first bilateral body part visible in the first preview image is odd (i.e., determination block 514="Yes"), the processor may select a second camera-lens combination with a wider field of view to use in capturing an image in block 516. The means for performing the operations of block 516 may include a processor (e.g., 302, 304, 310, 312, 314, 316, 318, 352, 360) coupled to a plurality of camera-lens combinations (e.g., 370a, 370b) and electronic storage (e.g., 320, 358, 425).

In response to determining that the determined first quantity of the first bilateral body part visible in the first preview image is an even (i.e., determination block 514="No"), the processor may select the first camera-lens combination used to obtain the first preview image to use in capturing an image in block 518. In some embodiments, the processor may take no action and the image may be captured by a default or standard camera-lens combination, such as the combination used to generate preview images and capture most images. The means for performing the operations of block 518 may include a processor (e.g., 302, 304, 310, 312, 314, 316, 318, 352, 360) coupled to a plurality of camera-lens combinations (e.g., 370a, 370b) and electronic storage (e.g., 320, 358, 425).

FIG. 5C illustrates a method 504 in accordance with some embodiments for capturing intended subjects in an image, which may include operations performed after the operations in block 514 of the method 502.

In response to determining that the determined first quantity of the first bilateral body part visible in the first preview image is an odd value (i.e., determination block 514="Yes"), the processor of the computing device may perform operations including obtaining a second preview image using a second camera-lens combination in block 520. For example, if the first camera-lens combination was a standard lens, the processor may use a wide-angle camera-lens combination to obtain the second preview image (e.g., 125) with a corresponding second field of view (e.g., 135). The means for performing the operations of block 520 may include a processor (e.g., 302, 304, 310, 312, 314, 316, 318, 352, 360) coupled to a plurality of camera-lens combinations (e.g., 370a, 370b) and electronic storage (e.g., 320, 358, 425).

In block 522, the processor of the computing device may perform operations including determining a second quantity of a bilateral body part of individuals visible in the second preview image obtained by the second camera-lens combination having the second field of view. In some embodiments the same bilateral body part of individuals determined in the first preview image in block 510 (i.e., the first bilateral body part) may be counted in the second preview image in block 522. For example, in this embodiment if eyes were the first bilateral body part counted in block 510, the quantity of eyes visible in the second field of view would be determine in block 522. In some embodiments a second bilateral body part of individuals different from the first bilateral boy part counted in the first preview image in block 510 may be counted in the second preview image in block 522. For example, in this embodiment if eyes were the first bilateral body part counted in block 510, the quantity of ears, cheeks, shoulders or other second bilateral body part visible in the second field of view may be determine in block 522. The means for performing the operations of block 522 may include a processor (e.g., 302, 304, 310, 312, 314, 316, 318, 352, 360) and electronic storage (e.g., 320, 358, 425).

In determination block 524, the processor of a computing device may perform operations including determining whether the determined second quantity of the bilateral body part (i.e., the first bilateral body part in some embodiments or the second bilateral body part in other embodiments) visible in the second preview image is an odd value. The means for performing the operations of block 524 may include a processor (e.g., 302, 304, 310, 312, 314, 316, 318, 352, 360) and electronic storage (e.g., 320, 358, 425).

In response to determining that the determined second quantity of the bilateral body part (i.e., the first bilateral body part in some embodiments or the second bilateral body part in other embodiments) visible in the second preview image is even (i.e., not an odd) (i.e., determination block 524="No"), the processor may select the second camera-lens combination with the wider field of view to use in capturing an image in block 516.

In response to determining that the determined second quantity of the bilateral body part (i.e., the first bilateral body part in some embodiments or the second bilateral body part in other embodiments) visible in the second preview image is an odd value (i.e., determination block 524="Yes"), the processor may select the first camera-lens combination with the narrower field of view to use in capturing an image in block 518.

Figure 5D:
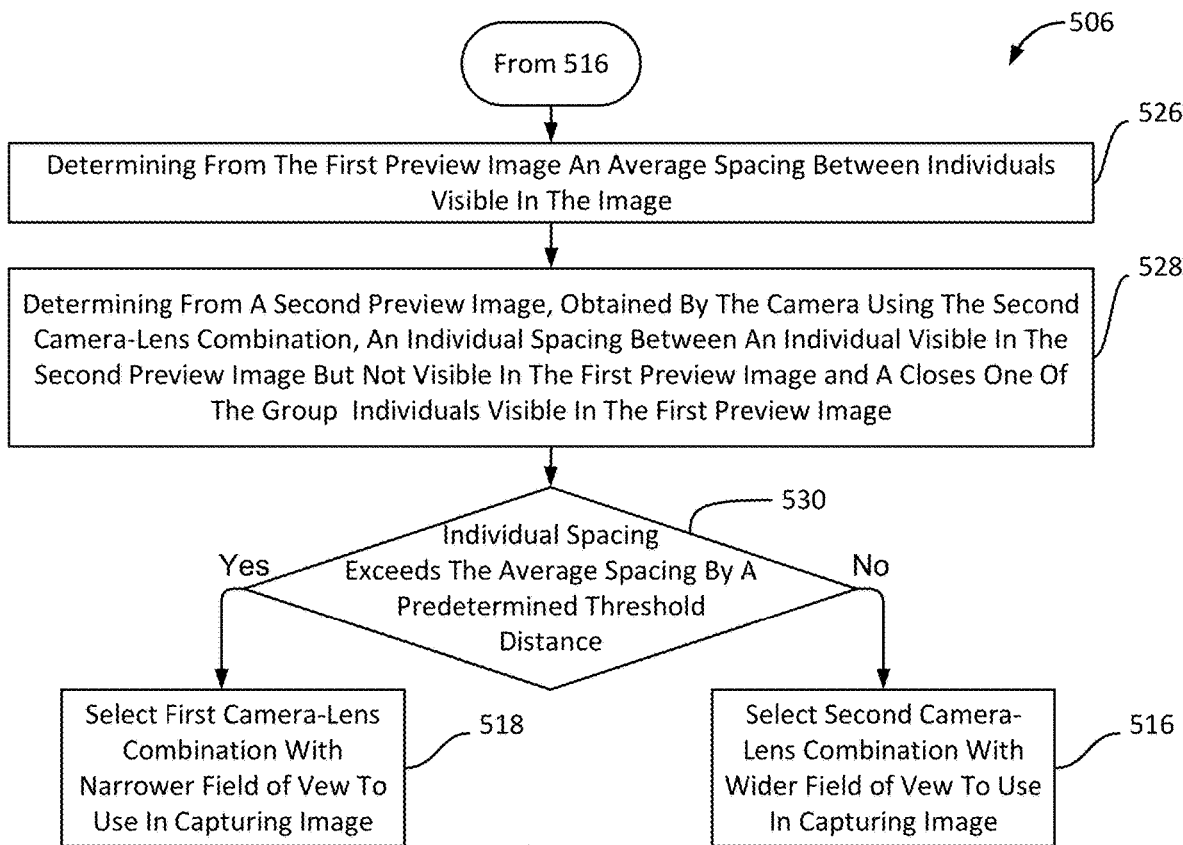

FIG. 5D illustrates a method 506 for capturing intended subjects in an image, which may include operations performed after the operations in block 516 of either of the methods 502 or 504.

In block 526, the processor of a computing device may perform operations including determining from the first preview image an average separation distance between the individuals visible therein. For example, the processor may perform image processing analysis of the first preview image (e.g., 127) associated with the first field of view (e.g., 137) determine the separation distances between individuals visible in the preview image, and determine an average separation distance between the individuals. The means for performing the operations of block 526 may include a processor (e.g., 302, 304, 310, 312, 314, 316, 318, 352, 360) coupled to an electronic storage (e.g., 320, 358, 425).

In block 528, the processor of a computing device may perform operations including determining from a second preview image taken with the second camera-lens combination with a wider field of view a separation distance between an individual visible in the second preview image but not fully visible in the first preview image and individuals visible in the first preview image. For example, the processor may use image processing techniques to identify a body part or center of each individuals in the two preview images, and estimate the distances between that body part or center of each individual in the images. The means for performing the operations of block 528 may include a processor (e.g., 302, 304, 310, 312, 314, 316, 318, 352, 360) coupled to a plurality of camera-lens combinations (e.g., 370a, 370b) and electronic storage (e.g., 320, 358, 425).

In determination block 530, the processor of a computing device may perform operations including determining whether the separation distance of the individual visible in the second preview image but not fully visible in the first preview image from a closest one of the individuals visible in the first preview image (referred to as the "added individual separation distance") exceeds the average separation distance of individuals in the first preview image by a predetermined threshold distance or distance ratio. For example, using the separation distances determined in blocks 526 and 528, the processor may determine whether a ratio of the added individual separation distance to the average separation distance of individuals in the first preview image exceeds a predetermined ratio value (e.g., 50%). The means for performing the operations of block 530 may include a processor (e.g., 302, 304, 310, 312, 314, 316, 318, 352, 360) and electronic storage (e.g., 320, 358, 425).

In response to determining that the added individual separation distance does not exceed the average separation distance of individuals in the first preview image by the predetermined threshold distance or distance ratio (i.e., determination block 530="No"), the processor may select the second camera-lens combination with the wider field of view to use in capturing an image in block 516.

In response to determining that the added individual separation distance exceeds the average separation distance by the predetermined threshold distance (i.e., determination block 530="Yes"), the processor may select the second camera-lens combination with the narrower field of view to use in capturing an image in block 518.

Figure 6:
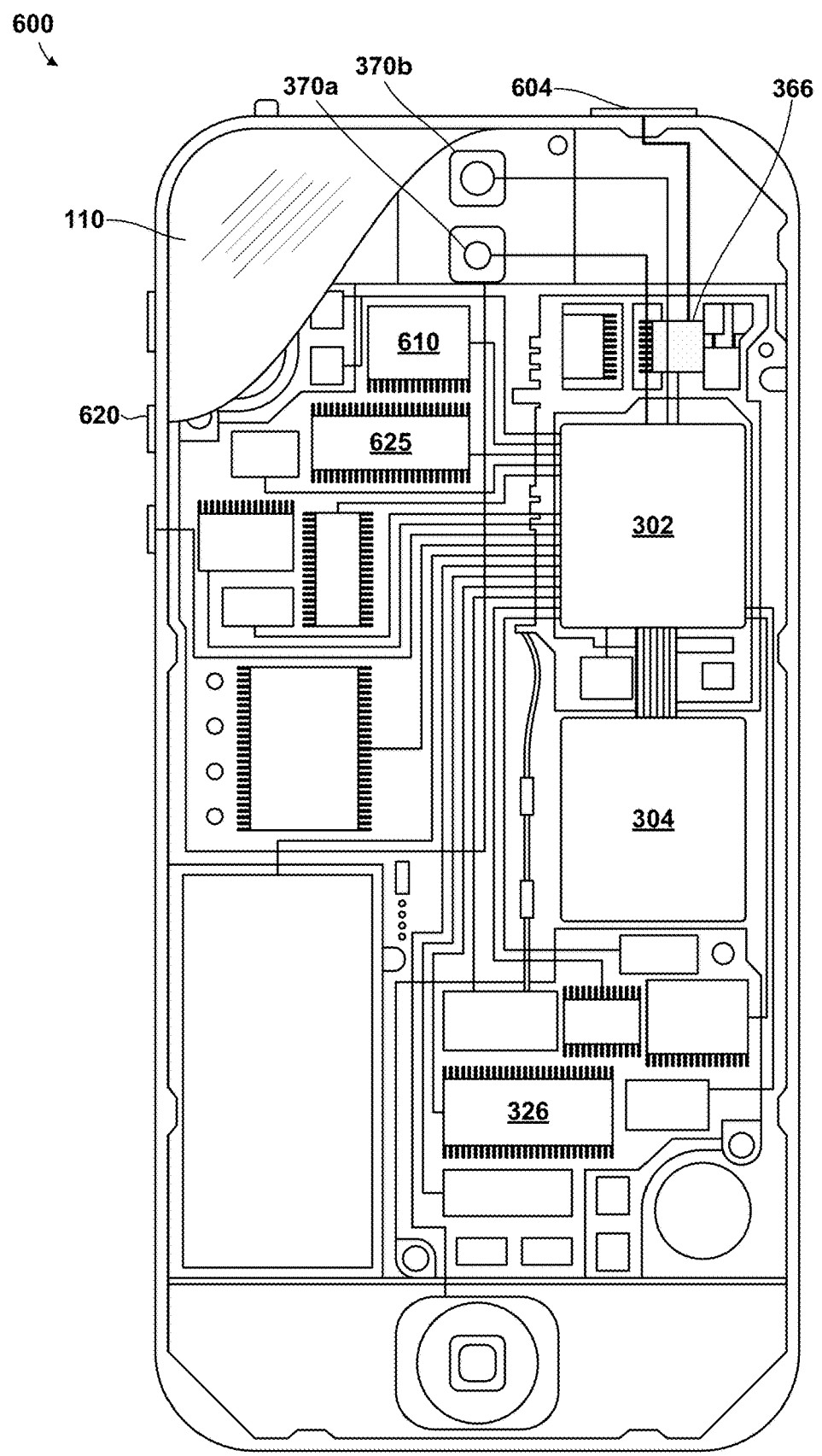
FIG. 6 is a component block diagram of a wireless computing device suitable for use with various embodiments.

The various embodiments (including, but not limited to, embodiments discussed above with reference to FIGS. 1-5D) may be implemented on a variety of computing devices, an example of which is illustrated in FIG. 6 in the form of a mobile computing device. With reference to FIGS. 1-6, a mobile computing device 600 may include a first SoC 302 (e.g., a SoC-CPU) coupled to a second SoC 304 (e.g., a 5G capable SoC). The first and second SoCs 302, 304 may be coupled to a first camera-lens combination 370a (e.g., with a standard field of view lens), a second camera-lens combination 370b (e.g., with a wide-area view of view lens), internal memory 625, and a display 115. In accordance with various embodiments, one or more additional camera-lens combinations with different field of view lenses may be included. Additionally, the mobile computing device 600 may include one or more antenna 604 for sending and receiving electromagnetic radiation that may be connected to one or more transceivers 366 (e.g., a wireless data link and/or cellular transceiver, etc.) coupled to one or more processors in the first, second, and/or third SoCs 302, 304. Mobile computing devices 600 may also include menu selection buttons or rocker switches 620 for receiving user inputs.

Mobile computing devices 600 may additionally include a sound encoding/decoding (CODEC) circuit 610, which digitizes sound received from a microphone into data packets suitable for wireless transmission and decodes received sound data packets to generate analog signals that are provided to the speaker to generate sound.

The processors implementing various embodiments may be any programmable microprocessor, microcomputer or multiple processor chip or chips that can be configured by software instructions (applications) to perform a variety of functions, including the functions of the various aspects described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a processor of a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards may include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), C-V2X, V2V, V2P, V2I, and V2N, etc. Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method executed by a processor of a computing device having a plurality of camera-lens combinations with different fields of view, comprising:
   determining a first quantity of a first bilateral body part of individuals visible in a first preview image obtained by a first camera-lens combination having a first field of view;
   determining whether the determined first quantity of the first bilateral body part visible in the first preview image is odd;
   determining a second quantity of the first bilateral body part of individuals visible in a second preview image obtained by a second camera-lens combination having a second field of view wider than that of the first field of view in response to determining that the determined first quantity of the first bilateral body part visible in the first preview image is odd;
   determining whether the determined second quantity of the first bilateral body part visible in the second preview image is odd;
   selecting the first camera-lens combination to use in capturing the image in response to determining that the second quantity of the first bilateral body part visible in the second preview image is odd; and
   selecting the second camera-lens combination with the second field of view in response to determining that the second quantity of the first bilateral body part visible in the second preview image is even.

2. The method of claim 1, further comprising:
   selecting the first camera-lens combination to use in capturing the image in response to determining that the determined first quantity of the first bilateral body part visible in the first preview image is even.

3. The method of claim 1, further comprising:
   determining a second quantity of a second bilateral body part of individuals visible in the second preview image, wherein the second bilateral body part is different from the first bilateral body part; and
   determining whether the determined second quantity of the second bilateral body part visible in the second preview image is odd, wherein
   selecting the first camera-lens combination to use in capturing the image is further in response to determining that the second quantity of the second bilateral body part visible in the second preview image is odd.

4. The method of claim 1, further comprising:
   determining from the first preview image an average separation distance between individuals visible in the first preview image;
   determining from a second preview image, obtained by the second camera-lens combination, an added individual separation distance between an individual visible in the second preview image but not fully visible in the first preview image and a closest one of the individuals visible in the first preview image, wherein
   selecting the first camera-lens combination to use in capturing the image is further in response to determining that the added individual separation distance exceeds the average separation distance between individuals visible in the first preview image by a predetermined threshold.

5. The method of claim 1, wherein:
   each of the plurality of camera-lens combinations comprises one camera coupled to one lens;
   selecting the first camera-lens combination comprises selecting a first camera; and
   selecting the second camera-lens combination comprises selecting a second camera.

6. The method of claim 1, wherein the first bilateral body part is one of ears, eyes, shoulders, or arms.

7. The method of claim 1, further comprising using only the first camera-lens combination to obtain view finder images while image signal processing blocks of other camera-lens combinations operate at low frames per second rates.

8. A computing device, comprising:
   a plurality of camera-lens combinations with different fields of view; and
   a processor coupled to the plurality of camera-lens combinations and configured with processor-executable instructions to:
      determine a first quantity of a first bilateral body part of individuals visible in a first preview image obtained by a first camera-lens combination having a first field of view;
      determine whether the determined first quantity of the first bilateral body part visible in the first preview image is odd;
      determine a second quantity of the first bilateral body part of individuals visible in a second preview image obtained by a second camera-lens combination having a second field of view wider than that of the first field of view in response to determining that the determined first quantity of the first bilateral body part visible in the first preview image is odd;
      determine whether the determined second quantity of the first bilateral body part visible in the second preview image is odd;
      select the first camera-lens combination to use in capturing the image in response to determining that the second quantity of the first bilateral body part visible in the second preview image is odd; and
      select the second camera-lens combination with the second field of view in response to determining that the second quantity of the first bilateral body part visible in the second preview image is even.

9. The computing device of claim 8, wherein the processor is further configured with processor-executable instructions to:

select the first camera-lens combination to use in capturing the image in response to determining that the determined first quantity of the first bilateral body part visible in the first preview image is even.

10. The computing device of claim 8, wherein the processor is further configured with processor-executable instructions to:
determine a second quantity of a second bilateral body part of individuals visible in the second preview image, wherein the second bilateral body part is different from the first bilateral body part; and
determine whether the determined second quantity of the second bilateral body part visible in the second preview image is odd, wherein
select the first camera-lens combination to use in capturing the image is further in response to determining that the second quantity of the second bilateral body part visible in the second preview image is odd.

11. The computing device of claim 8, wherein the processor is further configured with processor-executable instructions to:
determine from the first preview image an average separation distance between individuals visible in the first preview image;
determine from a second preview image, obtained by the second camera-lens combination, an added individual separation distance between an individual visible in the second preview image but not fully visible in the first preview image and a closest one of the individuals visible in the first preview image, wherein
select the first camera-lens combination to use in capturing the image is further in response to determining that the added individual separation distance exceeds the average separation distance between individuals visible in the first preview image by a predetermined threshold.

12. The computing device of claim 8, wherein:
each of the plurality of camera-lens combinations comprises one camera coupled to one lens;
the processor is further configured with processor-executable instructions to select the first camera-lens combination by selecting a first camera and select the second camera-lens combination by selecting a second camera.

13. The computing device of claim 8, wherein the first bilateral body part is one of ears, eyes, shoulders, or arms.

14. The computing device of claim 8, wherein the processor is further configured with processor-executable instructions to use only the first camera-lens combination to obtain view finder images while image signal processing blocks of other camera-lens combinations operate at low frames per second rates.

15. A non-transitory processor-readable medium having stored thereon processor-executable instructions configured to cause a processor of a computing device to perform operations comprising:
determining a first quantity of a first bilateral body part of individuals visible in a first preview image obtained by a first camera-lens combination having a first field of view;
determining whether the determined first quantity of the first bilateral body part visible in the first preview image is odd;
determining a second quantity of the first bilateral body part of individuals visible in a second preview image obtained by a second camera-lens combination having a second field of view wider than that of the first field of view in response to determining that the determined first quantity of the first bilateral body part visible in the first preview image is odd;
determining whether the determined second quantity of the first bilateral body part visible in the second preview image is odd;
selecting the first camera-lens combination to use in capturing the image in response to determining that the second quantity of the first bilateral body part visible in the second preview image is odd; and
selecting the second camera-lens combination with the second field of view in response to determining that the second quantity of the first bilateral body part visible in the second preview image is even.

16. The non-transitory processor-readable medium of claim 15, wherein the stored processor-executable instructions are configured to cause a processor of a computing device to perform operations further comprising:
selecting the first camera-lens combination to use in capturing the image in response to determining that the determined first quantity of the first bilateral body part visible in the first preview image is even.

17. The non-transitory processor-readable medium of claim 15, wherein the stored processor-executable instructions are configured to cause a processor of a computing device to perform operations further comprising:
determining a second quantity of a second bilateral body part of individuals visible in the second preview image, wherein the second bilateral body part is different from the first bilateral body part; and
determining whether the determined second quantity of the second bilateral body part visible in the second preview image is odd, wherein
selecting the first camera-lens combination to use in capturing the image is further in response to determining that the second quantity of the second bilateral body part visible in the second preview image is odd.

18. The non-transitory processor-readable medium of claim 15, wherein the stored processor-executable instructions are configured to cause a processor of a computing device to perform operations further comprising:
determining from the first preview image an average separation distance between individuals visible in the first preview image;
determining from a second preview image, obtained by the second camera-lens combination, an added individual separation distance between an individual visible in the second preview image but not fully visible in the first preview image and a closest one of the individuals visible in the first preview image, wherein
selecting the first camera-lens combination to use in capturing the image is further in response to determining that the added individual separation distance exceeds the average separation distance between individuals visible in the first preview image by a predetermined threshold.

19. The non-transitory processor-readable medium of claim 15, wherein the stored processor-executable instructions are configured to cause a processor of a computing device to perform operations wherein:
each of the plurality of camera-lens combinations comprises one camera coupled to one lens;
selecting the first camera-lens combination comprises selecting a first camera; and
selecting the second camera-lens combination comprises selecting a second camera.

20. The non-transitory processor-readable medium of claim 15, wherein the stored processor-executable instructions are configured to cause a processor of a computing device to perform operations wherein the first bilateral body part is one of ears, eyes, shoulders, or arms.

21. The non-transitory processor-readable medium of claim 15, wherein the stored processor-executable instructions are configured to cause a processor of a computing device to perform operations further comprising using only the first camera-lens combination to obtain view finder images while image signal processing blocks of other camera-lens combinations operate at low frames per second rates.

22. A computing device, comprising:
   a plurality of camera-lens combinations with different fields of view;
   means for determining a first quantity of a first bilateral body part of individuals visible in a first preview image obtained by a first camera-lens combination having a first field of view;
   means for determining whether the determined first quantity of the first bilateral body part visible in the first preview image is odd;
   means for determining a second quantity of the first bilateral body part of individuals visible in a second preview image obtained by a second camera-lens combination having a second field of view wider than that of the first field of view in response to the means for determining the first quantity of the first bilateral body part determining that the determined first quantity of the first bilateral body part visible in the first preview image is odd;
   means for determining whether the determined second quantity of the first bilateral body part visible in the second preview image is odd;
   means for selecting the first camera-lens combination to use in capturing the image in response to the means for determining the second quantity of the first bilateral body part in the second preview image determining that the second quantity of the first bilateral body part visible in the second preview image is odd; and
   means for selecting the second camera-lens combination with the second field of view in response to the means for determining the second quantity of the first bilateral body part in the second preview image determining that the second quantity of the first bilateral body part visible in the second preview image is even.

\* \* \* \* \*